Nov. 6, 1923.  1,472,932
J. F. O'CONNOR
FRICTION SHOCK ABSORBING MECHANISM
Filed Dec. 10, 1921  2 Sheets-Sheet 1
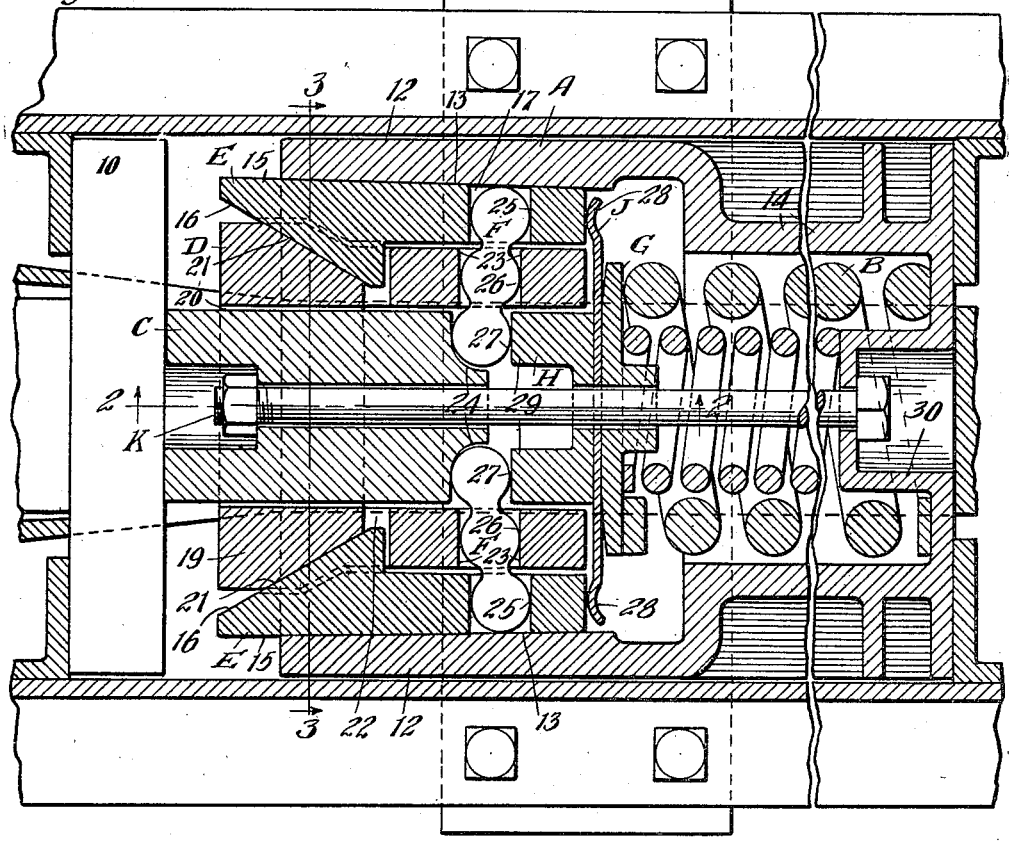
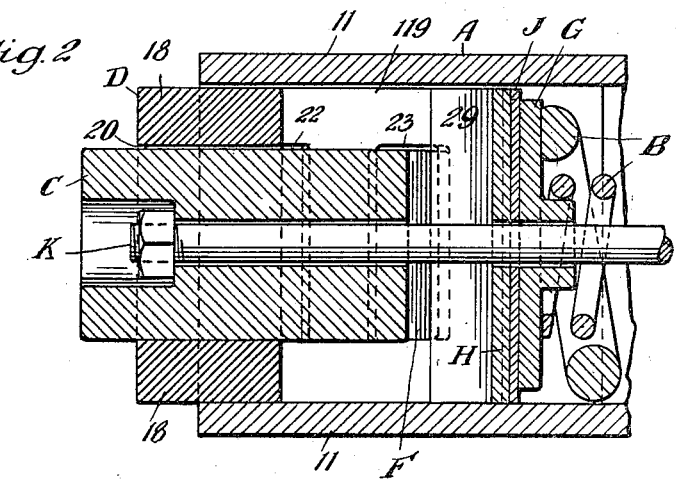
Witnesses
Wm. Geiger
Inventor
John F. O'Connor
By Geo. I. Haight
His Atty Nov. 6, 1923.  
J. F. O'CONNOR  
1,472,932  
FRICTION SHOCK ABSORBING MECHANISM  
Filed Dec. 10, 1921  
2 Sheets-Sheet 2
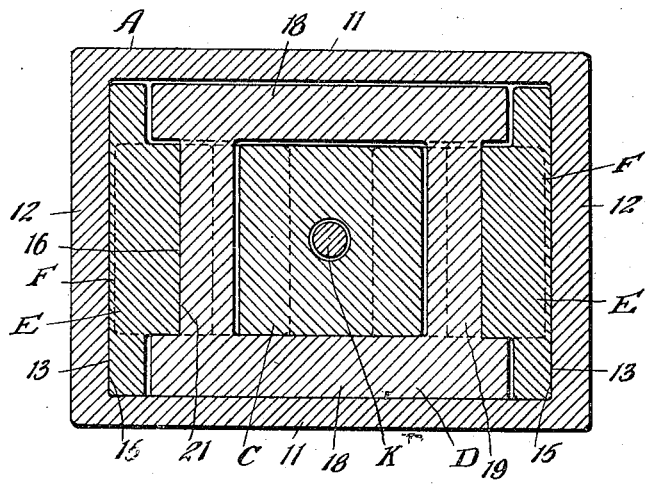
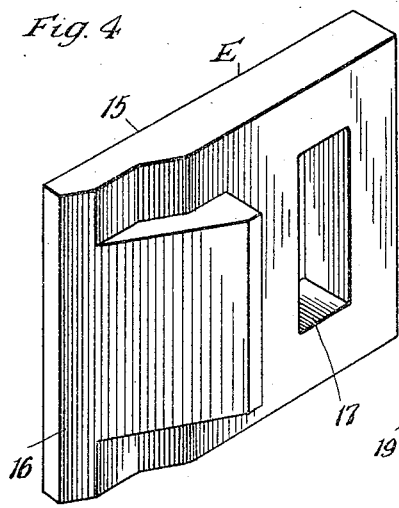
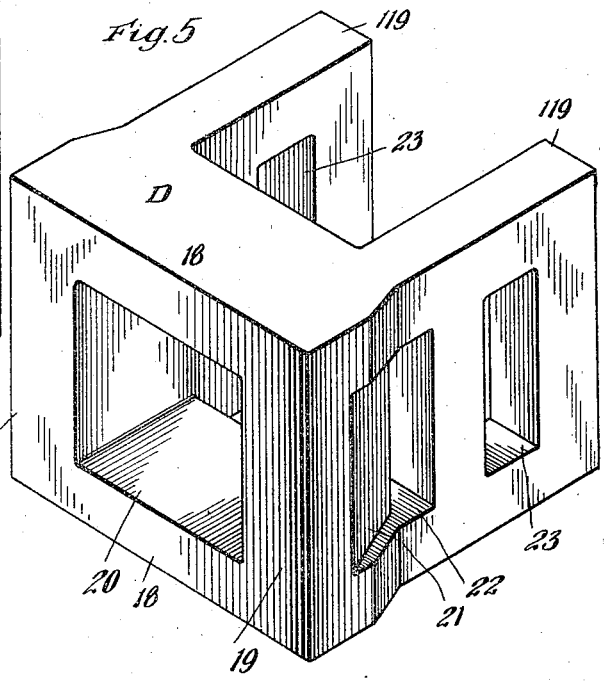
Witnesses  
Wm Geiger
Inventor  
John F. O'Connor  
By Geo. J. Haight  
His Atty.

Patented Nov. 6, 1923.

1,472,932

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed December 10, 1921. Serial No. 521,297.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism, especially adapted for railway draft rigging, wherein is obtained unusually high capacity, combined with certain release and in which the parts are so arranged that the actuating force or load applied in compressing the mechanism has its effect multiplied in being transferred to the wedging means which in turn cooperate with certain friction shoes.

In the drawings forming a part of this specification, Figure 1 is a horizontal, longitudinal sectional view, parts being broken away, of a portion of a railway draft rigging showing my improvements in connection therewith. Fig. 2 is a longitudinal, vertical, sectional view corresponding substantially to the section line 2—2 of Fig. 1. Fig. 3 is a vertical, transverse, sectional view corresponding to the section line 3—3 of Fig. 1 but illustrating the shock absorbing mechanism only. And Figs. 4 and 5 are detail perspectives of one of the friction shoes and the wedge member, respectively.

In said drawing, the improved shock absorbing mechanism is shown assembled with a common well known arrangement of draft sills and front and rear stop lugs and a front main follower 10.

The improved shock absorbing mechanism proper, as shown, comprises a combined friction shell and spring cage casting A; a main spring resistance B; a load-pressure-transmitting member C; a wedge member D; a pair of friction-shoes E—E; a pair of rocker levers F—F; a spring follower G; a pressure-transmitting block H; a supplemental plate spring J; and a retainer bolt K.

The casting A is preferably formed with the friction shell proper at its outer end, said shell having top and bottom walls 11—11 and side walls 12—12, the latter being provided on their inner faces with longitudinally extending friction surfaces 13—13. The surfaces 13 are preferably slightly converged inwardly of the shell. Rearwardly of the inner end of the friction shell proper, the casting is inwardly contracted to form a cage or casing, as indicated at 14 to properly maintain and center the spring B.

The two friction-shoes E—E are of like construction and each is provided on the outer side thereof with a longitudinally extending friction surface 15 and on the inner side thereof with a wedge face 16, near the outer end of the shoe. Rearwardly of the wedge face 16, the shoe E is provided with a transversely extending opening 17 for the purposes hereinafter described.

The wedge member D, as best shown in Figs. 1 and 5, is of rectangular outline at its outer end and has top and bottom horizontal walls 18—18 and heavy side walls 19—19. A rectangular longitudinally extending opening 20 is left within the wedge member D to freely accommodate the pressure-transmitting member C, as hereinafter described. Each side wall 19 of the wedge member D is formed on its outer side with a wedge face 21 corresponding to and cooperable with a wedge face 16 of a friction-shoe. Said wedge faces 21 are narrower in a vertical direction than the full height of the member D so that the side walls of the member D may be said to be undercut to receive the wedge sections of the shoes. At the inner ends of the wedge faces 21, the wedge member D is transversely recessed, as indicated at 22 so as to freely accommodate the inner shouldered end of the wedge section of the corresponding friction shoe. The wedge member D has the side walls thereof extended longitudinally, as indicated at 119—119 to a length corresponding approximately with the length of the friction shoes. Each of said extended side walls 119 is provided with a transversely extending opening 23 which, when the parts are in normal position as shown in Fig. 1, is slightly in advance of the openings 17 in the friction-shoes.

The pressure-transmitting member or block C is preferably of rectangular cross section as shown in Fig. 3 and is extended outwardly beyond the wedge D and the shoes E and receives the pressure or load direct from the front follower 10. Said pressure-transmitting member C slides freely longitudinally within the opening 20 of the wedge member D and at its inner end said member C is formed with a pair of oppositely disposed, rounded pivot forming bearings 24—24 which, when the parts are in normal position as shown in Fig. 1, are disposed slightly outwardly or in advance of the openings 23 in the wedge member D.

The two rocker levers F are of like construction and each is preferably so formed as to constitute, in effect, three cylinders partially merged, thus defining on outer cylindrical end section 25, an intermediate cylindrical section 26 and an inner cylindrical section 27. The diameters of the sections 25 and 26 are made to correspond approximately with the width of the openings 17 and 23, thus allowing the levers F to rock and have pivotal movement with respect to the shoes E and the wedge member D. The inner sections 27 of the levers F obviously have pivotal bearing on the bearing surfaces 24 of the pressure-transmitting member C.

Applied to the end of the spring B, adjacent the friction elements, is a spring follower G of suitable construction, as shown in Fig. 1. A plate spring J is disposed in front of the spring follower G, said spring J having its ends extended and preferably convexed forwardly, as indicated at 28—28 so as to engage the inner ends of the shoes E, and thus leaving the spring J slightly spaced from the inner ends of the side extensions 119 of the wedge D.

Forwardly of the spring J is located the pressure-transmitting block H, the latter having laterally spaced, vertically extending forwardly projected arms or heavy flanges 29—29 upon which bear the cylindrical sections 27 of the levers F.

The members C, H, J and G are all suitably apertured to accommodate the retainer bolt K which is anchored at its forward end to the member C and at its rear end to the casting A within a suitable hollow boss 30.

The operation is as follows, assuming an inward movement of the draw bar and front follower 10. As the follower 10 is forced inwardly, the pressure-transmitting member C is caused to travel simultaneously and uniformly therewith, this action being directly resisted by the spring B through the follower G, spring plate J, member H and levers F. As is well known to those skilled in the art, a certain amount of static friction will be present between the friction-shoes E and the friction surfaces 17 of the shell so that the shoes will initially remain stationary, this action being also augmented on account of the slight taper of the friction shell surfaces. By reason of the shoes E remaining stationary, the same provide fulcrums of a relatively fixed character for the outer ends of the rocker levers F and consequently, as the pressure-transmitting member C is moved longitudinally relatively to the casting A and shoes E, the levers F will be rocked about the shoes as fulcrums. As the levers F are rocked in the manner described, it is evident that the load or pressure transmitted from the member C to the levers F will be multiplied or increased as the same is transferred to the wedge D through the intermediate cylindrical sections 26 of the levers F. This leverage ratio may be made anything desired within practical limits and in the drawing the ratio approximates 2:1. Hence, it will be seen that for any given load applied to the member C, the effective load in the same direction applied to the wedge member D will be doubled or multiplied in any other desired ratio, as will be understood. By reason of this arrangement, I am enabled to employ blunter angles on the wedge faces than heretofore for any given capacity, thus facilitating release on account of the blunter angles possible, or stated in another manner, by retaining the same wedge angles as employed heretofore, the capacity can be correspondingly increased. After the pressure has been transferred to the wedge as above indicated, all the parts including the shoes, wedge, levers, member C and elements between the levers and the spring will be moved rearwardly simultaneously.

In release, at the initiation thereof, the shoes E normally tend to stick or remain stationary, thus again acting as relatively stationary fulcrums for the rocker levers F. The reactive force from the spring B is transferred to the cylindrical sections 27 of the levers F and due to the fact that there is no substantial resistance to the outward movement of the plunger C, the effective action of the spring in release is multiplied in approximately the ratio of 2 to 1, as illustrated, in forcing out the wedge D from between shoes E until such time as the parts have been collapsed sufficiently to allow the wedge, shoes and other parts being projected bodily outwardly to their full normal release position.

The plate spring J is employed to prevent any slack occurring in the parts arising from wear.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a spring resistance; friction-shoes cooperable with said shell; wedge means cooperable with said shoes, said wedge means being arranged in spaced relation to said spring resistance; a load-pressure-transmitting member; and a lever cooperating with said member and centrally pivoted on said wedge means arranged to transfer and increase the effective pressure from said member to said wedge means.

2. In a friction shock absorbing mechanism, the combination with a friction shell; of a spring resistance; friction-shoes cooperable with said shell; wedge means cooperable with said shoes; a load-pressure-transmitting member; and means cooperable with said shoes, said member, and said wedging means arranged to automatically transfer and increase the effective pressure from said member to said wedge means and positively move the latter back and forth.

3. In a friction shock absorbing mechanism, the combination with a friction shell; of a spring resistance; friction-shoes cooperable with said shell; a single wedge cooperable with all of the shoes; a load-pressure-transmitting member having its inner end extending into the wedge and movable independently of said wedge; and means cooperable with said wedge and the inner end of said member arranged to automatically transfer and increase the effective pressure from said member to said wedge during a compression movement.

4. In a friction shock absorbing mechanism, the combination with a friction shell; of a spring resistance; friction-shoes cooperable with said shell; a single wedge cooperable with all of the shoes; a load-pressure-transmitting member partly housed within said wedge and movable independently thereof; and means engaging said shoes and extending into the wedge and co-operating with the portion of said member housed within the wedge adapted to automatically transfer and increase the effective pressure from said member to said wedge during a compression movement.

5. In a friction shock absorbing mechanism, the combination with a friction shell; of a spring resistance; friction-shoes cooperable with said shell; wedge means cooperable with said shoes; a load-pressure-transmitting member; and lever elements cooperable with said member and said wedge means adapted to automatically transfer and increase the effective pressure from said member to said wedge means, said wedge means and lever elements having co-acting means thereon for effecting back and forth movement of the former.

6. In a friction shock absorbing mechanism, the combination with a friction shell; of a spring resistance; friction-shoes cooperable with said shell; wedge means cooperable with said shoes; a load-pressure-transmitting member; and lever elements having pivotal engagement with said member, said shoes, and said wedge means arranged to automatically transfer and increase the effective pressure from said member to said wedge means during a compression movement.

7. In a friction shock absorbing mechanism, the combination with a friction shell; of a spring resistance; friction-shoes cooperable with said shell; wedge means cooperable with said shoes; a load-pressure-transmitting member; means cooperable with said member and the wedge means arranged to transfer and increase the effective pressure from said member to said wedge means; and means interposed between said spring resistance and said second named means for automatically multiplying the effective force from the spring to the wedge means during release.

8. In a friction shock absorbing mechanism, the combination with a friction shell; of a spring resistance; friction-shoes cooperable with said shell; wedge means cooperable with said shoes; a load-pressure transmitting member; lever elements having pivotal engagement with said member, said shoes, and said wedge means arranged to automatically transfer and increase the effective pressure from said member to said wedge means during a compression movement; and means interposed between said spring resistance and said lever elements adapted to transfer the reactive force from the spring to said levers during a release movement of the mechanism.

9. In a friction shock absorbing mechanism, the combination with a friction shell having interior longitudinally extending friction surfaces; of a pair of friction-shoes cooperable with the friction surfaces of the shell and oppositely disposed; a wedge cooperable with said shoes; a pressure-transmitting element adapted to receive the actuating force independently of the wedge; a pair of rocker levers each having pivotal engagement with a shoe, a wedge and said member; a spring resistance; and pressure-transmitting means interposed between said spring resistance and the inner ends of said levers.

In witness that I claim the foregoing I have hereunto subscribed my name this 19th day of Nov., 1921.

JOHN F. O'CONNOR.

Witnesses:
CARRIE GAILING,
ANN BAKER.